(12) United States Patent
Offerle et al.

(10) Patent No.: US 11,124,191 B2
(45) Date of Patent: Sep. 21, 2021

(54) METHODS AND APPARATUS TO LIMIT A LOAD APPLIED TO A ROTATABLE SHAFT JOINT

(71) Applicant: Ford Global Technologies, LLC, Dearborn, MI (US)

(72) Inventors: Timothy Gerard Offerle, Saline, MI (US); Erick Michael Lavoie, Dearborn, MI (US); Geoffrey Bossio, Beverly Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 594 days.

(21) Appl. No.: 15/783,303

(22) Filed: Oct. 13, 2017

(65) Prior Publication Data
US 2019/0111927 A1 Apr. 18, 2019

(51) Int. Cl.
*B60W 30/184* (2012.01)
*B60W 10/119* (2012.01)
*B60W 10/20* (2006.01)

(52) U.S. Cl.
CPC ........ *B60W 30/184* (2013.01); *B60W 10/119* (2013.01); *B60W 10/20* (2013.01); *B60W 2510/22* (2013.01); *B60W 2540/10* (2013.01); *B60W 2540/18* (2013.01); *B60W 2710/207* (2013.01); *B60W 2720/403* (2013.01); *B60W 2720/406* (2013.01)

(58) Field of Classification Search
CPC combination set(s) only.
See application file for complete search history.

(56) References Cited

U.S. PATENT DOCUMENTS

| 1,665,280 A | 4/1928 | Rzeppa |
| 4,119,167 A | 10/1978 | Yamada et al. |
| 7,607,984 B2 * | 10/2009 | Hopson .................. F16D 3/223 464/145 |
| 2015/0149057 A1 * | 5/2015 | Oho ...................... B60W 10/06 701/84 |
| 2015/0203123 A1 * | 7/2015 | Darnell ............... B60W 50/082 701/37 |
| 2017/0096141 A1 * | 4/2017 | Won .................... B60W 30/184 |

(Continued)

FOREIGN PATENT DOCUMENTS

| JP | 2004019632 | 1/2004 |
| JP | 2004019632 A * | 1/2004 |

(Continued)

OTHER PUBLICATIONS

Ford, "205-04 Front Drive Halfshafts Disassembly and Assembly," May 31, 2016, 11 pages.

*Primary Examiner* — Christian Chace
*Assistant Examiner* — Jordan S Fei
(74) *Attorney, Agent, or Firm* — Ray Coppiellie; Hanley, Flight & Zimmerman, LLC

(57) ABSTRACT

Methods, apparatus, and articles of manufacture are disclosed for limiting a load applied to a rotatable shaft joint. An example apparatus comprises a comparator to, based on at least one of an angle of a rotatable shaft joint or a torque applied to the joint, determine whether at least one of the torque or the angle exceeds a threshold, and a limiter to limit at least one of the angle or the torque when at least one of the torque or the angle exceeds the threshold.

19 Claims, 7 Drawing Sheets

(56) References Cited

U.S. PATENT DOCUMENTS

2017/0113720 A1\* 4/2017 Kodera .................. B62D 6/002
2017/0120949 A1\* 5/2017 Sakamaki .............. B62D 5/005

FOREIGN PATENT DOCUMENTS

| JP | 4983309 | 7/2012 |
|----|---------|--------|
| KR | 101526381 | 6/2015 |
| WO | 2011152373 | 12/2011 |

\* cited by examiner

METHODS AND APPARATUS TO LIMIT A LOAD APPLIED TO A ROTATABLE SHAFT JOINT

FIELD OF THE DISCLOSURE

This disclosure relates generally to vehicles and, more particularly, to a controller for limiting a load applied to a rotatable shaft joint.

BACKGROUND

Vehicle powertrain systems can implement rotatable joints such as constant velocity (CV) joints to transmit a torque supplied by an engine and/or other mechanical power source of the vehicle to one or more steered wheel assemblies. Further, rotatable shaft joints can be utilized to alter the orientation of the torque from an orientation of a driveshaft coupled or otherwise connected to the mechanical power source of the vehicle to an orientation of a steered wheel, included in one or more of the steered wheel assemblies of the vehicle.

Additionally, the maximum torque that can be transmitted by a rotatable shaft joint before failure (e.g., breaking, fracture, degradation of integrity, etc.) varies with an operating angle (e.g., the magnitude that the orientation of the torque is altered) of the rotatable shaft joint. For rotatable shaft joints in a vehicle powertrain system, the operating angle of the rotatable shaft joint varies with the magnitude of a steering angle of the vehicle as well as a position of the suspension. As such, applying a high torque to a rotatable shaft joint of a vehicle powertrain system at large steering angles and/or large amounts of suspension travel (e.g., while drifting, doing donuts, traveling off-road, etc.) can, in some cases, lead to failure of the rotatable shaft joint.

SUMMARY

An apparatus for limiting a load applied to a rotatable shaft joint is disclosed herein. An example apparatus comprises a comparator to, based on at least one of an angle of a rotatable shaft joint or a torque applied to the joint, determine whether at least one of the torque or the angle exceeds a threshold and a limiter to limit at least one of the angle or the torque when at least one of the torque or the angle exceeds the threshold.

Another example apparatus comprises a constant velocity (CV) joint load controller, the controller to evaluate at least one of a torque applied to or an angle of a CV joint, and wherein the controller is to limit at least one of the torque applied to or the angle of the CV joint when at least one of the torque applied to or the angle of the CV joint exceeds a threshold.

An example method comprises measuring at least one of an angle of a rotatable shaft joint or a torque applied to the joint, determining whether at least one of the torque applied to the joint or the angle of the joint exceeds a threshold, and limiting at least one of the angle of the joint or the torque applied to the joint in response to at least one of the torque applied to the joint or the angle of the joint exceeding the threshold.

Figure 1:
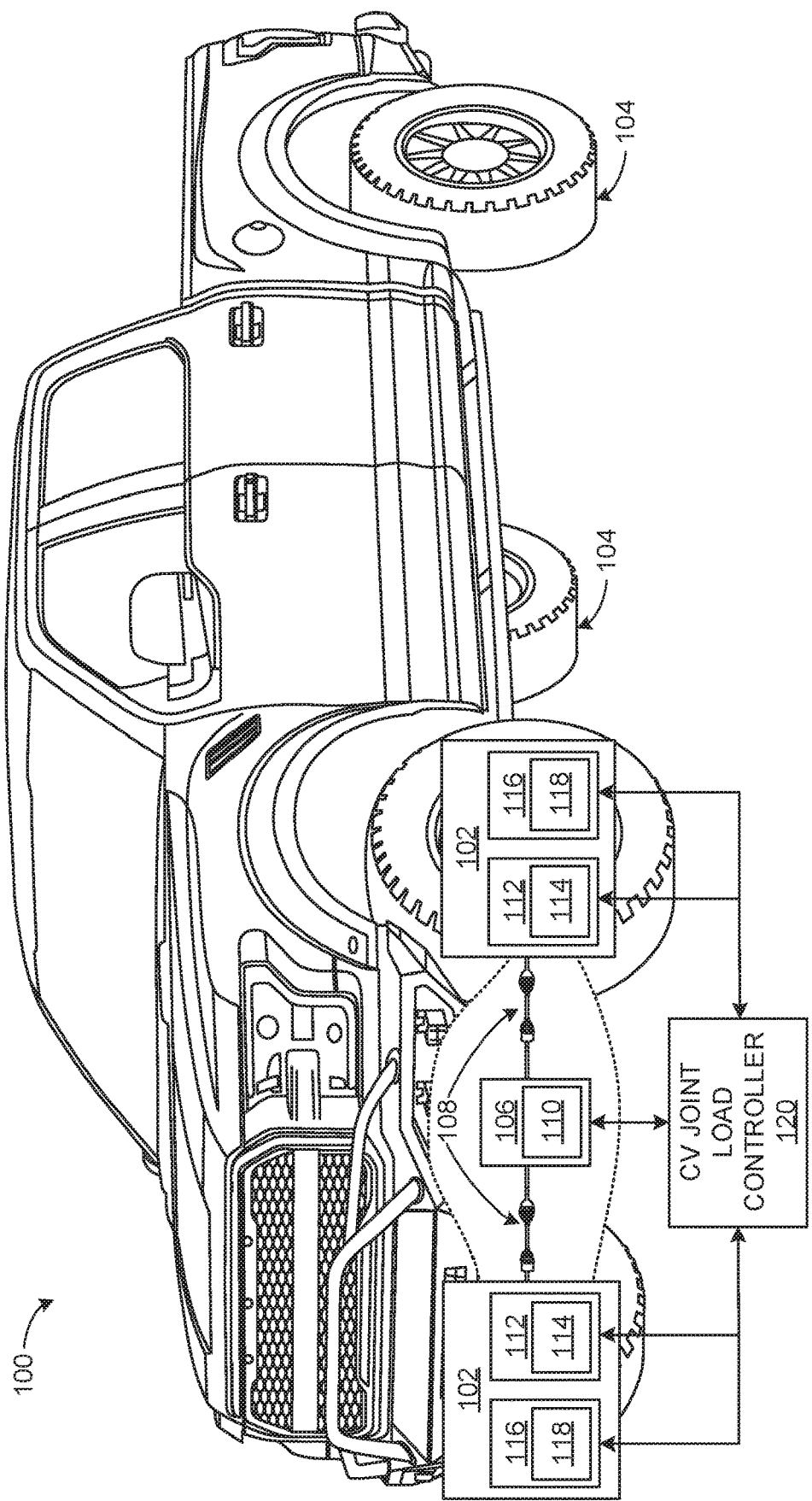
FIG. 1 illustrates an example vehicle including a CV joint assembly and a CV load controller by which the examples disclosed herein can be implemented.

The figures are not to scale. Wherever possible, the same reference numbers will be used throughout the drawing(s) and accompanying written description to refer to the same parts. As used in this patent, stating that any part (e.g., a layer, film, area, or plate) is in any way positioned on (e.g., positioned on, located on, disposed on, or formed on, etc.) another part, indicates that the referenced part is either in contact with the other part, or that the referenced part is above the other part with one or more intermediate part(s) located therebetween. Stating that any part is in contact with another part means that there is no intermediate part between the two parts.

DETAILED DESCRIPTION

Vehicle powertrain systems can implement rotatable shaft joints (e.g., CV joints) capable of transmitting a torque to a steered wheel, wherein the orientation of the torque output at the steered wheel can be different than the orientation of the torque input at a driveshaft coupled or otherwise connected to the mechanical power source (e.g., powertrain) of the vehicle. Typically, an operating angle of a rotatable shaft joint such as a CV joint increases with in an increase in steering angle commanded by a user of the vehicle and/or an increase in travel of a suspension system of the vehicle.

In some cases, the maximum torque a CV joint is capable of transmitting without failure decreases with an increase in an operating angle of the joint. Transmitting a large torque applied to a CV joint during periods of large steering angles and/or large amounts of suspension travel (e.g., while drifting, doing donuts, traveling off-road, etc.) can, in some cases, lead to failure (e.g., breaking, fracture, degradation of integrity, etc.) of the CV joint. Similarly, commanding a large steering angle or incurring a large amount of suspension travel during periods of large torque transmission can also, in some cases, lead to failure of the CV joint.

CV joints are typically designed, through sizing and material selection, to be capable of transmitting a maximum torque output by a powertrain of a vehicle at the maximum steering angle and/or the maximum suspension travel of the vehicle. However, for some vehicles, CV joints may unable to be designed to the aforementioned criteria due to space constraints, material constraints, etc. In such cases, the CV joint transmitting a maximum torque output by a powertrain at a maximum steering angle and/or a maximum suspension travel can damage the CV joint. Such damage to the CV joint can prevent operation of the vehicle, stranding the user of the vehicle, and/or requiring a replacement of the CV joint.

Examples disclosed herein limit at least one of a torque transmitted by (e.g., applied to) a rotatable shaft joint such as a CV joint and an operating angle of the joint. More specifically, the examples limit at least one of the transmitted torque and operating angle to prevent failure of the rotatable shaft joint during operation of the vehicle. While the examples described below are described as being applied to vehicles having CV joints, the teachings of this disclosure may be more generally applied to other rotatable shaft joints such as universal joints, flexible couplings, etc.

As will be set forth in greater detail below, the examples described herein provide a CV joint load controller to evaluate the torque transmitted by the CV joint and the operating angle of the CV joint and limit at least one of the applied torque and operating angle in response to at least one of the applied torque and operating angle exceeding a threshold.

In some examples, when the torque communicated to the steered wheels is limited, the CV joint load controller disclosed herein redistributes a portion of the torque (e.g., additional torque) commanded by the user of the vehicle to the non-steered wheels such that the total output torque of the vehicle matches the commanded torque, even when torque to the steered wheels is limited. Additionally or alternatively, a portion of the torque commanded by the user of the vehicle can be redistributed to the lesser steered wheel of the one or more steered wheels, the angle of the lesser steered wheel based on the Ackerman steering geometry.

As will be discussed in greater detail below in accordance with the teachings of this disclosure, the CV joint load controller can have various configurations that may depend on a type of CV joint and/or characteristics associated with the vehicle to which the CV joint load controller is applied. In examples disclosed herein, these configurations can be changed or altered to optimize at least one of limiting the load applied to the CV joint and/or user experience when at least one of the torque transmitted through the CV joint and the operating angle of the CV joint is limited.

Turning to the figures, FIG. 1 illustrates an example vehicle 100 implementing the teachings of this disclosure. The vehicle 100 can include one or more steered wheel(s) 102, one or more non-steered wheel(s) 104, and one or more powertrain system(s) 106. In the illustrated example of FIG. 1, the vehicle 100 has two steered wheels 102, two non-steered wheels 104, and one powertrain system 106. Further, at least one of the one or more steered wheel(s) 102 and the one or more non-steered wheels 104 is coupled to the powertrain system 106 by one or more CV joint assemblies 108. In such examples, the one or more CV joint assemblies 108 transmit a torque output from the powertrain system 106 to at least one of the one or more steered wheel(s) 102 and the one or more non-steered wheels(s) 104. In the example of FIG. 1, the vehicle 100 includes two CV joint assemblies 108 coupling the two steered wheels 102 to the one powertrain system 106. Additionally, the torque output by the powertrain system 106 can be measured by a powertrain controller 110, the powertrain controller 110 determining the torque output utilizing one or more sensors disposed in the powertrain system 106.

In some examples, the steering angle of the one or more steered wheel(s) 102 can vary with an input from a user of the vehicle 100. Additionally, the steering angle of the one or more steered wheel(s) 102 can be controlled by an Electronic Power Assisted Steering (EPAS) system 112. In such examples, the EPAS system 112 controls the steering angle of the one or more steered wheel(s) based upon an input from at least one of a user or a computer system of the vehicle 100. In some examples, due to the geometry of the one or more steered wheel(s) 102, a separate steering angle will be commanded to each of the steered wheels 102 based on an Ackerman steering geometry. In some examples, the EPAS system 112 can further include a steering angle sensor 114 to determine the steering angle of the one or more steered wheel(s) 102.

Additionally, the vehicle 100 can include one or more suspension system(s) 116 to provide a comfortable ride for the occupants of the vehicle 100. In some examples, one or more of the steered wheels(s) 102 and one or more of the non-steered wheel(s) 104 are coupled to the vehicle 100 by the one or more suspension system(s) 116. Further, each of the one or more suspension system(s) 116 possess a stiffness and a range of motion (e.g., suspension travel) and, in some cases, each of the one or more suspension system(s) 116 function independently of one another. Additionally, in some examples, the position of the one or more suspension system(s) 116, measured by one or more ride height sensor(s) 118, impacts the operating angle of the one or more CV joint assemblies 108.

In some examples, the vehicle 100 can be a front wheel drive (FWD) vehicle or a four wheel drive (4WD) vehicle. In both FWD and 4WD vehicles, the one or more steered wheel(s) 102 are powered and receive a torque from the powertrain system 106. In examples where the vehicle 100 is a 4WD vehicle, the one or more steered wheel(s) 102 and the one or more non-steered wheel(s) 104 are powered by and receive a torque from the powertrain system 106. Additionally, in examples where the vehicle 100 is a FWD vehicle, the one or more non-steered wheel(s) 104 are not powered and do not receive a torque from the powertrain system 106.

The vehicle 100 illustrated in FIG. 1 further includes an example constant velocity joint load controller 120, described in further detail below in conjunction with FIG. 3. The constant velocity (CV) joint load controller 120 receives at least one of a torque applied to the CV joint assembly 108 by the powertrain system 106 and an operating angle of the CV joint assembly 108. The operating angle may be based on a steering angle received from the EPAS system 112 and a suspension position received from the suspension system 116. If the CV joint load controller 120 determines that the torque and/or operating angle exceed a pre-defined threshold, the CV joint load controller 120 limits at least one of the torque applied to the CV joint assembly 108 and the operating angle of the CV joint assembly 108 to prevent failure of the CV joint assembly 108.

Figures 2A, 2B:
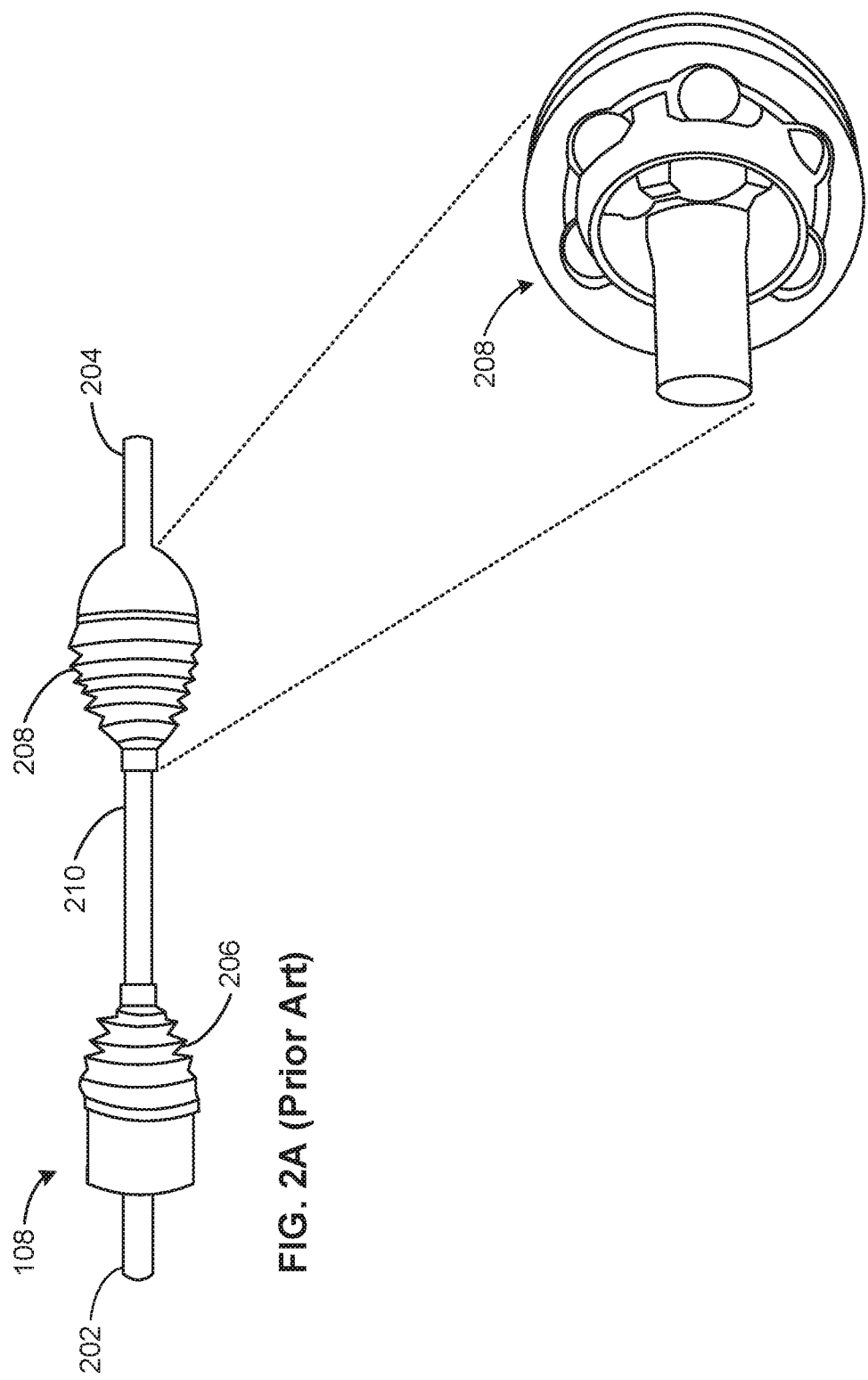
FIG. 2A illustrates in greater detail the CV joint assembly of FIG. 1.
FIG. 2B illustrates an internal view of a portion of the CV joint assembly of FIG. 2A.

FIG. 2A illustrates in greater detail the CV joint assembly 108 of FIG. 1. The CV joint assembly 108 of FIG. 2A has a first end 202 and a second end 204. In some such examples, the first end 202 couples to the powertrain system 106 and the second end couples to the steered wheel 102. Further, the first end 202 remains coaxial with an output of the powertrain system 106 and the second end 204 remains coaxial with an input to the steered wheel 102. Additionally, the CV joint assembly 108 includes a first CV joint 206 and a second CV joint 208. In some examples, such as the illustrated example of FIG. 2A, the first CV joint 206 couples the first end 202 to a shaft 210. Further, the first CV joint 206 can allow for an axis of the first end 202 and an axis of the shaft 210 to extend at different angles and can transmit a torque from the first end 202 to the shaft 210, wherein the orientation of the torque at the first end 202 can be different from the orientation of the torque at the shaft 210.

Additionally, the second CV joint 208 couples the second end 204 to the shaft 210. Further, the second CV joint 208 can allow for an axis of the second end 204 and an axis of the shaft 210 to extend at different angles and can transmit a torque from the shaft 210 to the second end 204, wherein the orientation of the torque at the shaft 210 can be different from the orientation of the torque at the second end 204. In operation, the torque output by the powertrain system 106 is transmitted to the first end 202, which transmits the torque to the shaft 210 through the first CV joint 206, which further transmits the torque to the second end 204 through the second CV joint 208, which further transmits the torque to the steered wheel 102.

FIG. 2B illustrates an internal view of a portion of the CV joint assembly 108 of FIG. 2A. In the example of FIG. 2B, the second CV joint 208 as shown is a Rzeppa style Constant velocity joint.

Figure 3:
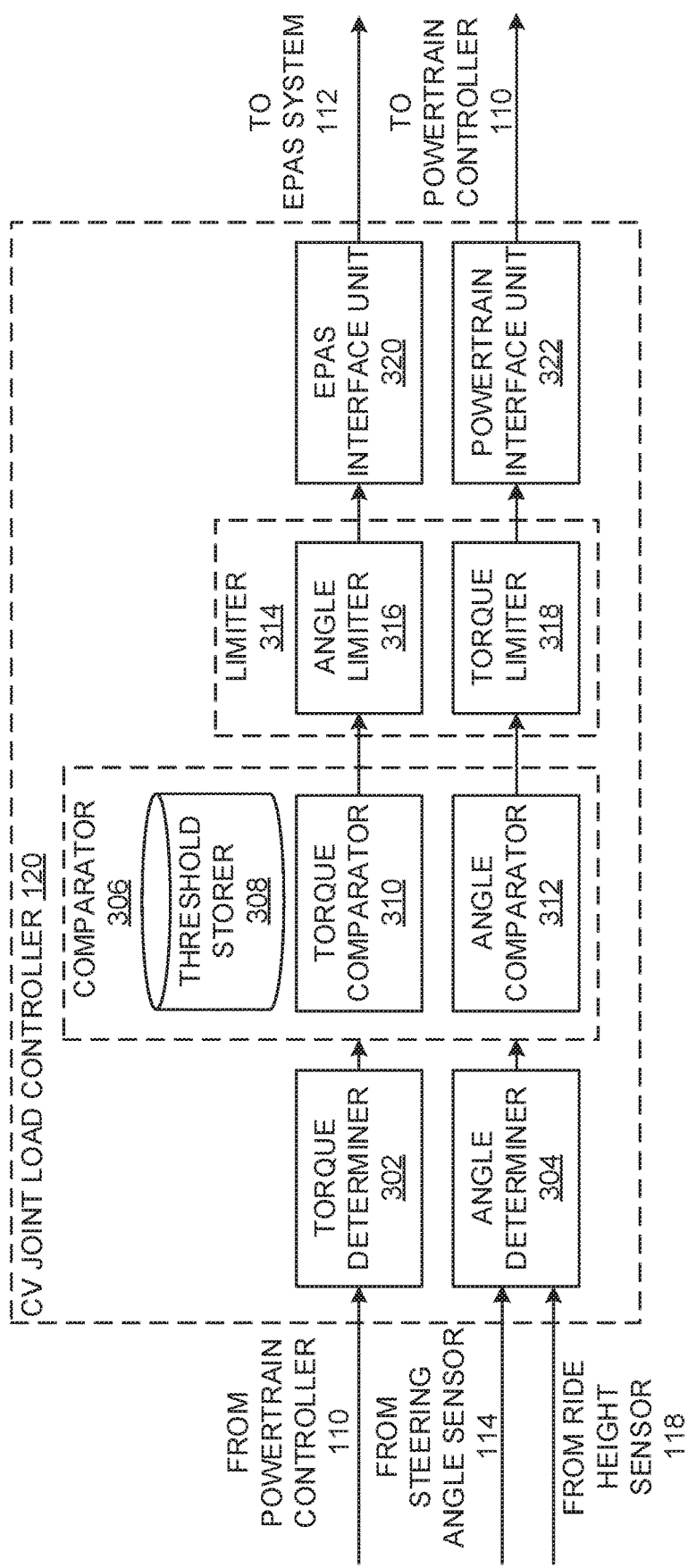
FIG. 3 is a block diagram further detailing the CV joint load controller of FIG. 1 by which the examples disclosed herein can be implemented.

FIG. 3 is a block diagram further detailing the CV joint load controller 120 of FIG. 1 by which the examples disclosed herein can be implemented. The example CV joint load controller 120 can, in some examples, include an example torque determiner 302, an example angle determiner 304, an example comparator 306 which can, in some examples, include an example threshold storer 308, an example torque comparator 310, and an example angle comparator 312. The CV joint load controller 120 further includes an example limiter 314 which can, in some examples, include an example angle limiter 316 and an example torque limiter 318, an example EPAS interface unit 320, and an example powertrain interface unit 322.

The example torque determiner 302, included or otherwise implemented by the CV joint load controller 120, is capable of determining a torque applied to at least one of the first CV joint 206 and the second CV joint 208. Determining a torque applied can further include receiving a signal from the powertrain controller 110. In some examples, the signal received is an analog voltage. In such examples, the torque determiner 302, utilizing a previously determined calibration curve for a signal output by the powertrain controller 110, determines a torque value from the voltage value received. Additionally or alternatively, the signal received may be a data packet including a digital representation of a torque value.

The example angle determiner 304, included or otherwise implemented by the CV joint load controller 120, is capable of determining an operating angle of at least one of the first CV joint 206 and the second CV joint 208. Determining an operating angle can further include receiving a signal from at least one of the steering angle sensor 114 and the ride height sensor 118. In some examples, the signals received are analog voltages. In such examples, the angle determiner 304, utilizing a calibration curve known for at least one of the steering angle sensor 114 and the ride height sensor 118, can determine at least one of a steering angle and a suspension position. Additionally or alternatively, the signals received are digital data packets including data representing at least one of the steering angle and the suspension position.

Additionally, the angle determiner 304 is further to determine the operating angle for the first CV joint 206 and the second CV joint 208 based on at least one of the steering angle and the suspension position. In some examples, when the vehicle 100 includes the steering angle sensor 114 and the ride height sensor 118, the angle determiner 304 determines the operating angle of the first CV joint 206 and the second CV joint 208 based on the steering angle and the suspension position. Additionally or alternatively, when the vehicle 100 includes only one of the steering angle sensor 114 or the ride height sensor 118, the angle determiner 304 determines the operating angle of the first CV joint 206 and the second CV joint 208 based on only one of the steering angle and the suspension position, respectively.

Upon each of the torque determiner 302 and the angle determiner 304 determining the torque applied to and the operating angle of the first CV joint 206 and the second CV joint 208, the torque applied and the operating angle are further communicated to the example comparator 306. In some examples, the comparator 306 includes or otherwise implements the example threshold storer 308, the example torque comparator 310 and the example angle comparator 312. In such examples, the torque applied is communicated to the torque comparator 310 and the operating angle is communicated to the angle comparator 312.

The threshold storer 308, as illustrated in FIG. 3, is capable of storing at least one of a torque threshold and an operating angle threshold for at least one of the first CV joint 206 and the second CV joint 208. In some examples, the torque threshold and the operating angle threshold stored by the threshold storer 308 are fixed values based upon one or more characteristics of the first CV joint 206 and the second CV joint 208. In such examples, the one or more characteristics stored are further based upon known failure criteria of the first CV joint 206 and the second CV joint 208.

Additionally or alternatively, the one or more characteristics stored by the threshold storer 308 may be variable values, varying with at least one of age and/or usage of the first CV joint 206 and the second CV joint 208. In such examples, the variable values are further based upon known failure criteria of the first CV joint 206 and the second CV joint 208. Further, the threshold storer 308 communicates the torque threshold to the torque comparator 310 and the operating angle threshold to the angle comparator 312.

Additionally or alternatively, the one or more characteristics stored by the threshold storer 308 may be stored in lookup tables. For example, the threshold storer 308 may store at least one of a first lookup table for threshold torque and a second lookup table for operating angle. Further in such examples, values of threshold torque stored in the first lookup table can vary based on operating angle. For example, the threshold torque at a large steering angle would be less than a threshold torque at a lesser steering angle.

Additionally, values of threshold operating angle stored in the second lookup table may vary based on torque applied. For example, the threshold operating angle when a large torque is applied may be less than the threshold operating angle for a lesser applied torque. In such cases, the relationship between applied torque and threshold operating angle as well as the relationship between operating angle and threshold torque are based upon one or more characteristics of the first CV joint 206 and the second CV joint 208. In some examples, the relationship between applied torque and threshold operating angle may match the relationship between threshold torque and operating angle. In such examples, the threshold storer 308 may only store one lookup table, the lookup table comparing torque and operating angle.

The threshold storer 308 may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The threshold storer 308 may additionally or alternatively be implemented by one or more double data rate (DDR) memories, such as DDR, DDR2, DDR3, DDR4, mobile DDR (mDDR), etc. The threshold storer 308 may additionally or alternatively be implemented by one or more mass storage devices such as hard disk drive(s), compact disk drive(s), digital versatile disk drive(s), etc. While in the illustrated example the threshold storer 308 is illustrated as a single database, the threshold storer 308 may be implemented by any number and/or type(s) of databases. Furthermore, the data stored in the threshold storer 308 may be in any data format such as, for example, binary data, comma delimited data, tab delimited data, structured query language (SQL) structures, etc.

The torque comparator 310, included or otherwise implemented by the comparator 306, compares the threshold torque received from the threshold storer 308 and the applied torque received from the torque determiner 302. In some examples, the torque comparator 310 determines the difference (e.g., +3.4 foot-pounds, −5.2 foot-pounds, 0.0 foot-pounds, etc.) between the threshold torque and the applied torque utilizing a subtraction operation. In such examples, a positive difference indicates the applied torque is less than the threshold torque and a negative difference indicates the applied torque is greater than the threshold torque. Additionally or alternatively, the torque comparator 310 determines the ratio (e.g., 1.25, 1.0, 0.68, etc.) of the applied torque to the threshold torque utilizing a division operation. In such examples, a ratio of greater than one indicates the applied torque exceeds the threshold torque and a ratio of less than one indicates the applied torque is below the threshold torque. Additionally or alternatively, the torque comparator 310 can output at least one of the threshold torque and applied torque as received by the torque comparator 310.

The angle comparator 312, included or otherwise implemented by the comparator 306, compares the threshold operating angle received from the threshold storer 308 and the operating angle received from the angle determiner 304. In some examples, the angle comparator 312 determines the difference (e.g., +3.2 degrees, 0 degrees, −2.1 degrees, etc.) between the threshold operating angle and the operating angle utilizing a subtraction operation. In such examples, a positive difference indicates the operating angle is less than the threshold operating angle and a negative difference indicates the operating angle is greater than the threshold operating angle. Additionally or alternatively, the angle comparator 312 determines the ratio (e.g., 1.4, 1.0, 0.95, etc.) of the operating angle to the threshold operating angle utilizing a division operation. In such examples, a ratio of greater than one indicates the operating angle exceeds the angle threshold and a ratio of less than one indicates the operating angle is below the threshold operating angle. Additionally or alternatively, the angle comparator 312 can output at least one of the threshold operating angle and the operating angle as received by the angle comparator 312.

In some examples, the comparator 306 receives the result of the calculations completed by at least one of the torque comparator 310 and the angle comparator 312. In response to at least one of the torque applied and the operating angle of at least one of the first CV joint 206 and the second CV joint 208 exceeding a threshold (e.g., limit), the comparator 306 further communicates a notification to the limiter 314 that a failure prevention routine to ensure the integrity (e.g., protect) at least one of the first CV joint 206 and the second CV joint 208 must be performed.

Upon each of the torque comparator 310 and the angle comparator 312 comparing the torque applied to the first CV joint 206 and the second CV joint 208 to a threshold torque and the operating angle of the first CV joint 206 and the second CV joint 208 to a threshold operating angle, respectively, the torque applied and the operating angle are further communicated to the limiter 314. The torque comparison is communicated to the angle limiter 316 and the operating angle comparison is communicated to the torque limiter 318. In some examples, the limiter 314 can further prioritize preserving one of applied torque or operating angle. In some such examples, the limiter 314 can prioritize applied torque over operating angle, and operating angle is limited before applied torque is limited. Additionally or alternatively, the limiter 314 can prioritize operating angle over applied torque, and applied torque is limited before operating angle.

The angle limiter 316, included in or otherwise implemented by the limiter 314, is capable of limiting the operating angle of at least one of the first CV joint 206 and the second CV joint 208 to a maximum allowable angle, the maximum allowable operating angle determined from at least one of testing and historical data. In some examples, the limiting occurs in response to a torque applied to at least one of the first CV joint 206 and the second CV joint 208 exceeding a threshold. Limiting the operating angle can further include, when the vehicle 100 includes the ride height sensor 118, determining a maximum allowable steering angle for which the operating angle of each of the first CV joint 206 and the second CV joint 208 are less than or equal to a maximum based upon the current suspension position as determined by the ride height sensor 118.

Alternatively, the vehicle 100 may not include or otherwise implement the ride height sensor 118. In such examples, determining a maximum allowable steering angle for which the operating angle of each of the first CV joint 206 and the second CV joint 208 are less than or equal to a maximum may be based upon the extents of suspension travel, governed by the geometry of the one or more suspension system(s) 116.

Once the maximum allowable steering angle is determined, the angle limiter 316 is further to communicate the maximum allowable steering angle value to the EPAS interface unit 320.

The example torque limiter 318 can be included in or otherwise implemented by the limiter 314. Further, the torque limiter 318 is capable of determining the maximum transmittable torque for least one of the first CV joint 206 and the second CV joint 208 in response to an operating angle of at least one of the first CV joint 206 and the second CV joint 208 exceeding a threshold. In some examples, the maximum transmittable torque is determined from at least one of testing and historical data. In some examples, in addition to determining the maximum transmittable torque, the torque limiter 318 is further to attempt to apply the torque commanded by the user of the vehicle 100.

In such examples, attempting to apply the commanded torque further includes determining the difference torque between the commanded torque and the maximum transmittable torque. Further, the torque limiter 318 can redistribute the difference torque to non-limited wheels of the vehicle 100. In some examples, if the vehicle 100 is a 4WD vehicle, the torque limiter 318 can redistribute the difference torque to the one or more non-steered wheel(s) 104. Additionally or alternatively, if the vehicle 100 is a FWD vehicle, the torque limiter 318 can redistribute the difference torque wheel of the two steered wheels 102 with at least one of a lesser steering angle and lesser suspension travel.

Once at least one of the maximum transmittable torque and the redistributed torque to be applied is determined, the torque limiter 318 is further to communicate the value of torque to be applied to each of the steered wheels 102 and the non-steered wheels 104 to the powertrain interface unit 322.

The example EPAS interface unit 320, included in or otherwise implemented by the CV joint load controller 120, is capable of interfacing with the EPAS system 112 of the vehicle 100. In some examples, the EPAS interface unit 320 can communicate the maximum allowable steering angle as received from the angle limiter 316 to the EPAS system 112. In such examples, the EPAS system 112 is further to ensure the steering angle does not exceed the maximum allowable steering angle.

Additionally or alternatively, the EPAS interface unit 320 can monitor the EPAS system 112 to ensure the steering angle does not exceed the maximum allowable steering angle. In such examples, when a steering angle commanded by a user of the vehicle 100 exceeds the maximum allowable steering angle, the EPAS interface unit 320 is further to override the steering angle commanded by the user of the vehicle 100 such that the steering angle of the vehicle 100 is limited to the maximum allowable steering angle. In some examples, the EPAS interface unit 320 can further notify a driver of the vehicle 100, by at least one of an auditory or visual alert, that the steering angle of the vehicle 100 is limited.

The example powertrain interface unit 322, included in or otherwise implemented by the CV joint load controller 120, is a device capable of interfacing with the powertrain controller 110 of the powertrain system 106. In some examples, the powertrain interface unit 322 can communicate the maximum transmittable torque to the powertrain controller 110. In such examples, the powertrain controller 110 is further to ensure the torque applied to the limited CV joint does not exceed the maximum transmittable torque Additionally or alternatively, the powertrain interface unit 322 can directly command the powertrain controller 110 to apply the determined value of torque to be applied by the powertrain system 106 to each of the steered wheels 102 and the non-steered wheels 104. In some examples, the powertrain interface unit 322 can further notify a driver of the vehicle 100, by at least one of an auditory or visual alert, that the torque output by the powertrain system 106 is limited.

Although the example CV joint load controller 120 of FIG. 3 includes one torque determiner 302, one angle determiner 304, one comparator 306, one threshold storer 308, one torque comparator 310, one angle comparator 312, one limiter 314, one angle limiter 316, one torque limiter 318, one EPAS interface unit 320, and one powertrain interface unit 322, the example CV joint load controller 120 as disclosed herein can be used with any number(s) of torque determiners 302, angle determiners 304, comparators 306, threshold storers 308, torque comparators 310, angle comparators 312, limiters 314, angle limiters 316, torque limiters 318. EPAS interface units 320, and powertrain interface units 322.

While an example manner of implementing the example CV joint load controller 120 of FIG. 1 is illustrated in FIG. 3, one or more of the elements, processes and/or devices illustrated in FIG. 3 may be combined, divided, re-arranged, omitted, eliminated and/or implemented in any other way. Further, the example torque determiner 302, the example angle determiner 304, the example comparator 306 which can, in some examples, include the example threshold storer 308, the example torque comparator 310, and the example angle comparator 312, the example limiter 314 which can, in some examples, include the example angle limiter 316 and the example torque limiter 318, the example EPAS interface unit 320, and the example powertrain interface unit 322 and/or, more generally, the example CV joint load controller 120 of FIG. 1 may be implemented by hardware, software, firmware and/or any combination of hardware, software and/or firmware. Thus, for example, any of the example torque determiner 302, the example angle determiner 304, the example comparator 306 which can, in some examples, include the example threshold storer 308, the example torque comparator 310, and the example angle comparator 312, the example limiter 314 which can, in some examples, include the example angle limiter 316 and the example torque limiter 318, the example EPAS interface unit 320, and the example powertrain interface unit 322 and/or, more generally, the example CV joint load controller 120 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example torque determiner 302, the example angle determiner 304, the example comparator 306 which can, in some examples, include the example threshold storer 308, the example torque comparator 310, and the example angle comparator 312, the example limiter 314 which can, in some examples, include the example angle limiter 316 and the example torque limiter 318, the example EPAS interface unit 320, and the example powertrain interface unit 322 is/are hereby expressly defined to include a non-transitory computer readable storage device or storage disk such as a memory, a digital versatile disk (DVD), a compact disk (CD), a Blu-ray disk, etc. including the software and/or firmware. Further still, the example CV joint load controller 120 of FIG. 1 may include one or more elements, processes and/or devices in addition to, or instead of, those illustrated in FIG. 4, and/or may include more than one of any or all of the illustrated elements, processes and devices.

Figure 4:
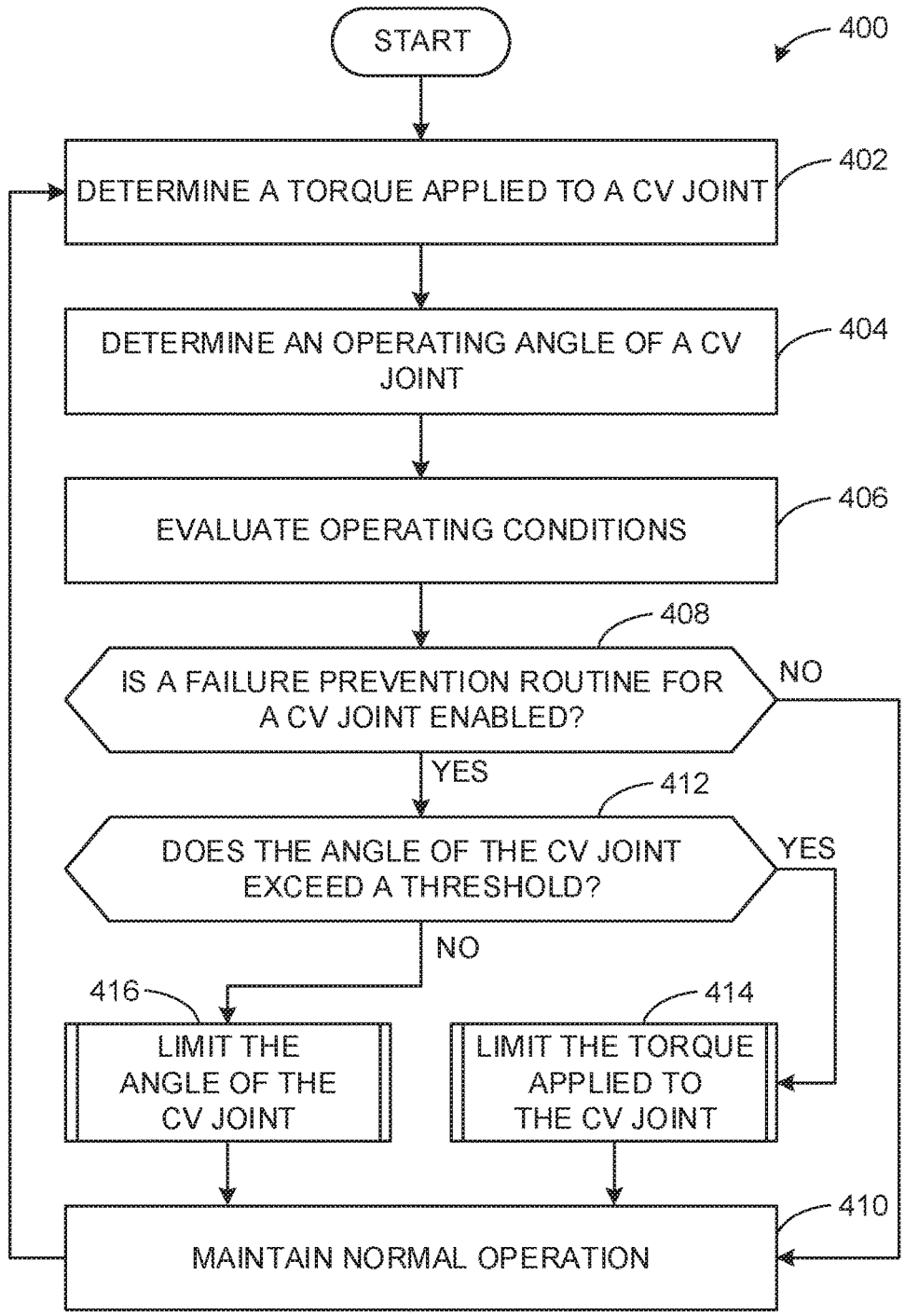
FIG. 4 is a flowchart representative of an example method that can be executed to implement the example CV joint load controller of FIG. 3.
Figure 5:
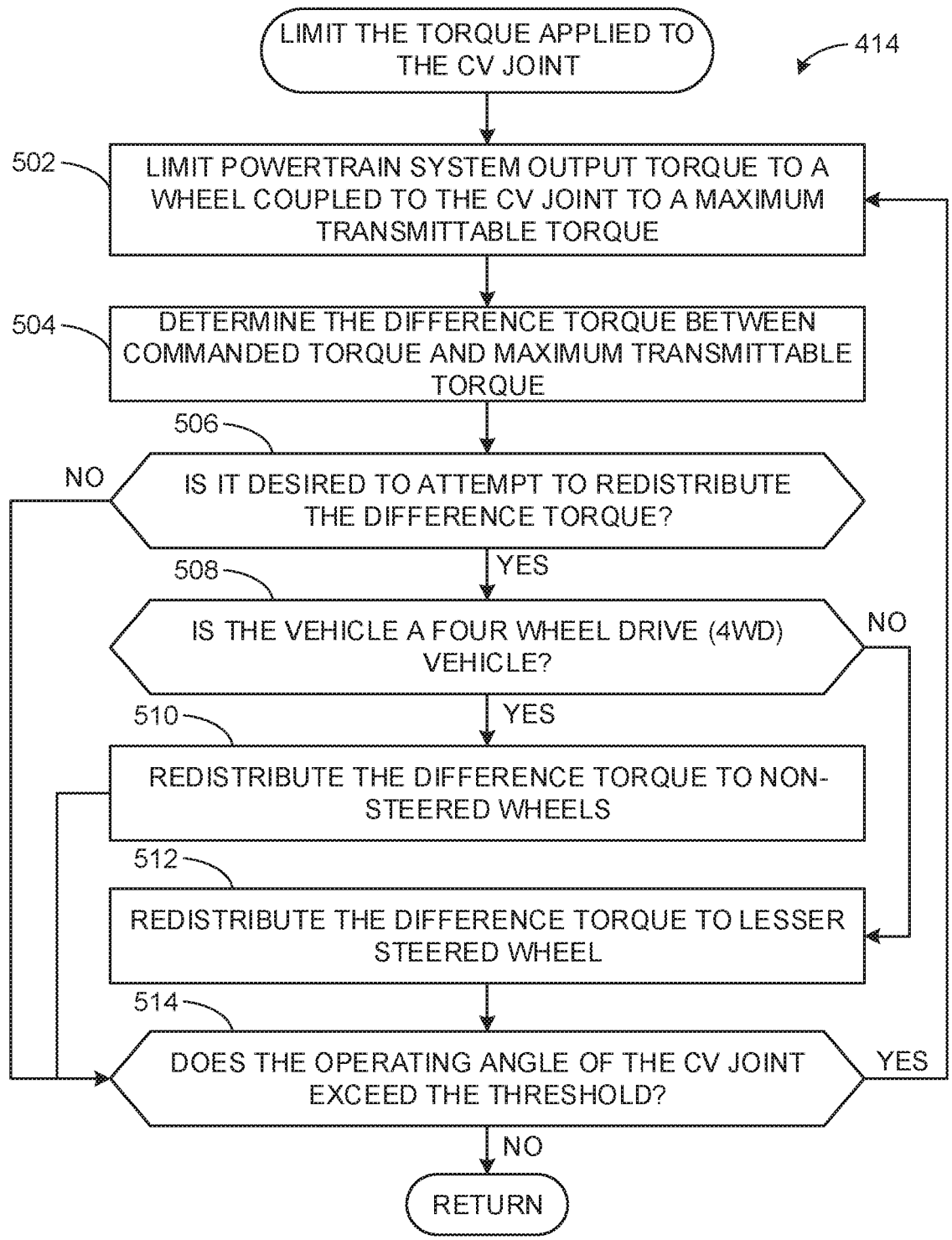
FIG. 5 is a flowchart representative of an example method that can be executed to implement the example torque limiter of FIG. 3.
Figure 6:
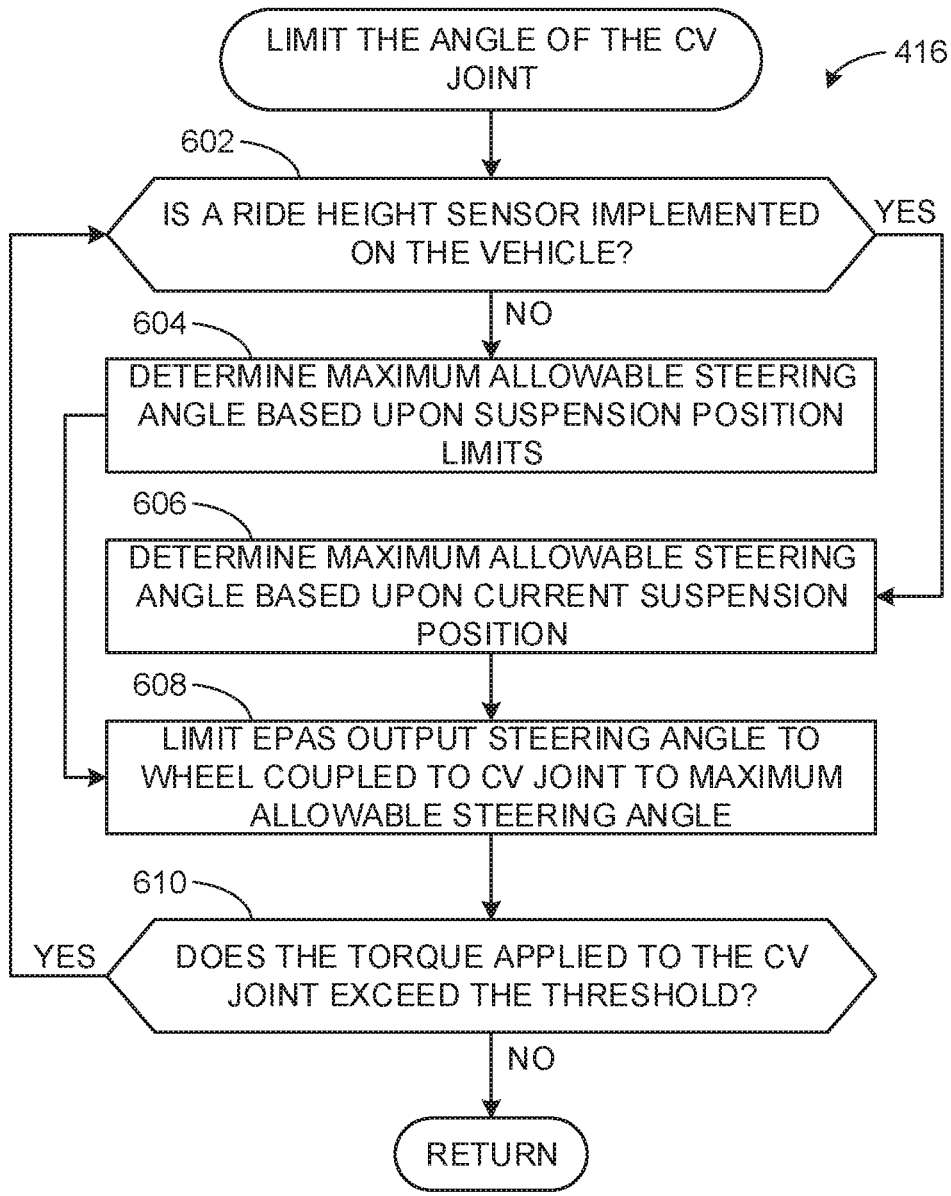
FIG. 6 is a flowchart representative of an example method that can be executed to implement the example angle limiter of FIG. 3.

Flowcharts representative of example methods for implementing the example CV joint load controller 120 of FIG. 1 are shown in FIGS. 4-6. In this example, the method(s) may be implemented using machine readable instructions comprising a program for execution by a processor such as the processor 712 shown in the example processor platform 700 discussed below in connection with FIG. 7. The program may be embodied in software stored on a non-transitory computer readable storage medium such as a CD-ROM, a floppy disk, a hard drive, a digital versatile disk (DVD), a Blu-ray disk, or a memory associated with the processor 712, but the entire program and/or parts thereof could alternatively be executed by a device other than the processor 712 and/or embodied in firmware or dedicated hardware. Further, although the example program is described with reference to the flowchart illustrated in FIG. 4-6, many other methods of implementing the example CV joint load controller 120 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example processes of FIGS. 4-6 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open-ended in the same manner as the term "comprising" and "including" are open ended.

The example method 400 of FIG. 4 begins at block 402. At block 402, the example torque determiner 302 determines a torque applied to at least one of the first CV joint 206 and the second CV joint 208 based on a signal received from the powertrain controller 110.

At block 404, the example angle determiner 304 determines an operating angle of at least one of the first CV joint 206 and the second CV joint 208. In some examples, the operating angle is based on at least one of a steering angle based on a signal received from the steering angle sensor 114 and a suspension position based on a signal received from the ride height sensor 118.

At block 406, in response to completing the determination of each of a torque applied to and an operating angle of at least one of the first CV joint 206 and the second CV joint 208, the comparator 306 evaluates the operating conditions of at least one of the first CV joint 206 and the second CV joint 208. Evaluating the operating conditions further includes comparing torque threshold and operating angle threshold values, stored in the threshold storer 308, to applied torque and operating angle values previously determined at block 402 and block 404, respectively. In some examples, the comparison can result in a difference (e.g., +1.2 foot-pounds, −3.4 foot-pounds, +2.5 degrees, −4.6 degrees, etc.) between the threshold value and the operating value. Additionally or alternatively, the comparison can result in a ratio (e.g., 0.75, 0.95, 1.0, 1.1, 1.25, etc.) between the threshold value and the operating value.

At block 408, the comparator 306 determines whether a failure prevention routine is enabled for at least one of the first CV joint 206 and the second CV joint 208. Alternatively, the determination can be completed by the limiter 314. In some examples, determining whether a failure prevention routine is enabled further includes determining if the difference or ratio between threshold value and operating value for at least one of applied torque and operating angle, as calculated at block 406, indicate that one or more of applied torque and operating angle exceed a threshold. In response to neither applied torque nor operating angle exceeding a threshold, processing transfers to block 410, wherein the comparator 306 communicates a notification instructing the subsystems of the vehicle 100 to maintain normal operation and processing of the example method 400 returns to block 402. Alternatively, in response to at least one applied torque and operating angle exceeding a threshold, processing transfers to block 412.

At block 412, in response to determining the failure prevention routine is enabled, the comparator 306 determines which of the CV joint characteristics caused the failure prevention routine to be enabled at block 408. In response to determining it is the operating angle that exceeds the threshold, processing transfers to block 414, described in further detail in conjunction with FIG. 5, where the torque applied to the CV joint is limited. Alternatively, in response to determining the operating angle does not exceed the threshold, it is known the torque applied to the CV joint exceeds the threshold. In such examples, processing transfers to block 416, described in further detail in conjunction with FIG. 6, where the operating angle of the CV joint is limited. In response to the completion of at least one of block 414 or block 416, processing transfers to block 410 of the example method 400.

An example method that may be executed to limit the torque applied to a CV joint (FIG. 4, block 414), the torque applied to the CV joint limited due to a large operating angle of said CV joint, is illustrated in FIG. 5. With reference to the preceding figures and associated descriptions, the example method of FIG. 5 begins execution at block 502 at which the torque limiter 318, communicating via the powertrain interface unit 322, commands the powertrain controller 110 to limit the torque to the steered wheel 102. Further, the steered wheeled 102 may be coupled to at least one of the first CV joint 206 and the second CV joint 208 for which the failure prevention routine is enabled, and the applied torque is limited to a maximum transmittable torque.

At block 504, the torque limiter 318 determines a difference torque (e.g., +3.5 foot-pounds, +6.2 foot-pounds, etc.) between the commanded torque, in some examples commanded by at least one of a user or computer algorithm of the vehicle 100, and the maximum allowable torque.

At block 506, the powertrain interface unit 322 determines if it is desired to attempt to redistribute the difference between commanded torque and maximum transmittable torque as calculated at block 504. In response to determining it is desired to attempt to redistribute the difference torque, processing proceeds to block 508. Alternatively, in response to determining it is not desired to attempt to redistribute the difference torque, the torque output by the powertrain system 106 is limited and processing proceeds to block 514.

At block 508, the torque limiter 318 determines whether the vehicle 100 is a 4WD vehicle capable of distributing a torque load to the one or more non-steered wheel(s) 104. In response to determining the vehicle 100 is a 4WD vehicle, processing transfers to block 510. Alternatively, in response to determining the vehicle 100 is not a 4WD vehicle (e.g., the vehicle 100 is a FWD vehicle), processing transfers to block 512.

At block 510, the torque limiter 318, communicating via the powertrain interface unit 322, commands the powertrain controller 110 of the 4WD vehicle to redistribute the difference torque, determined at block 504 by the torque limiter 318, to the one or more non-steered wheels(s) 104 of the vehicle 100.

At block 512, the torque limiter 318, communicating via the powertrain interface unit 322, commands the powertrain controller 110 of the FWD vehicle to redistribute the difference torque, determined at block 504 by the torque limiter 318, to the lesser steered wheel of the one or more steered wheel(s) 102 of the vehicle 100. Upon completion of at least one of block 510 and block 512, processing transfers to block 514 of the example method of FIG. 5.

At block 514, the angle comparator 312 determines whether the operating angle of the CV joint still exceeds a threshold. In response to the operating angle of the CV joint continuing to exceed the threshold, processing transfers to block 502, where the torque limiter 318, communicating via the powertrain interface unit 322, continues to limit the torque applied to the CV joint.

Alternatively, in response to the angle comparator 312 determining the operating angle of the CV joint no longer exceeds the threshold, processing returns to block 410 of the example method 400, illustrated in FIG. 4.

An example method that may be executed to limit the operating angle of the CV joint (FIG. 4, block 416), the operating angle of the CV joint limited due to a large torque applied to the CV joint, is illustrated in FIG. 6. With reference to the preceding figures and associated descriptions, the example method of FIG. 6 begins execution at block 602 at which the angle limiter 316 determines whether the one or more suspension system(s) 116 implement or otherwise include ride height sensors 118. In response to determining the one or more suspension system(s) 116 do not include or otherwise implement ride height sensors 118, processing transfers to block 604. Alternatively, in response to determining the one or more suspension system(s) 116 do include ride height sensors 118, processing transfers to block 606.

At block 604, the angle limiter 316 determines a maximum allowable steering angle based upon the maximum allowable operating angle of the first CV joint 206 and the second CV joint 208 based upon the maximum travel of the suspension system 116 (i.e., the suspension system 116 having the greatest effect on the operating angle of the CV joint). In doing so, the angle limiter 316 ensures that the operating angle of each of the first CV joint 206 and the second CV joint 208 do not exceed a maximum at the determined maximum allowable steering angle, regardless of the position of the suspension system 116.

Alternatively, at block 606, the angle limiter 316 determines a maximum allowable steering angle based upon the current position of the suspension system 116, determined by the ride height sensor 118.

At block 608, the angle limiter 316, communicating via the EPAS interface unit 320, commands the EPAS system 112 to limit the steering angle of the steered wheel 102, coupled to the first CV joint 206 and the second CV joint 208, to the maximum allowable operating angle as determined by at least one of block 604 and block 606. Upon completion of limiting the steering angle of the steered wheel 102 at block 608, processing transfers to block 610 of the example method of FIG. 6.

At block 610, the torque comparator 310 determines whether the torque applied to the CV joint still exceeds a threshold. In response to the torque applied to the CV joint continuing to exceed the threshold, processing transfers to block 602, where the angle limiter 316 determines whether the one or more suspension system(s) 116 implement or otherwise include ride height sensors 118.

Alternatively, in response to the torque comparator 310 determining the torque applied to the CV joint no longer exceeds the threshold, processing returns to block 410 of the example method 400, illustrated in FIG. 4.

Figure 7:
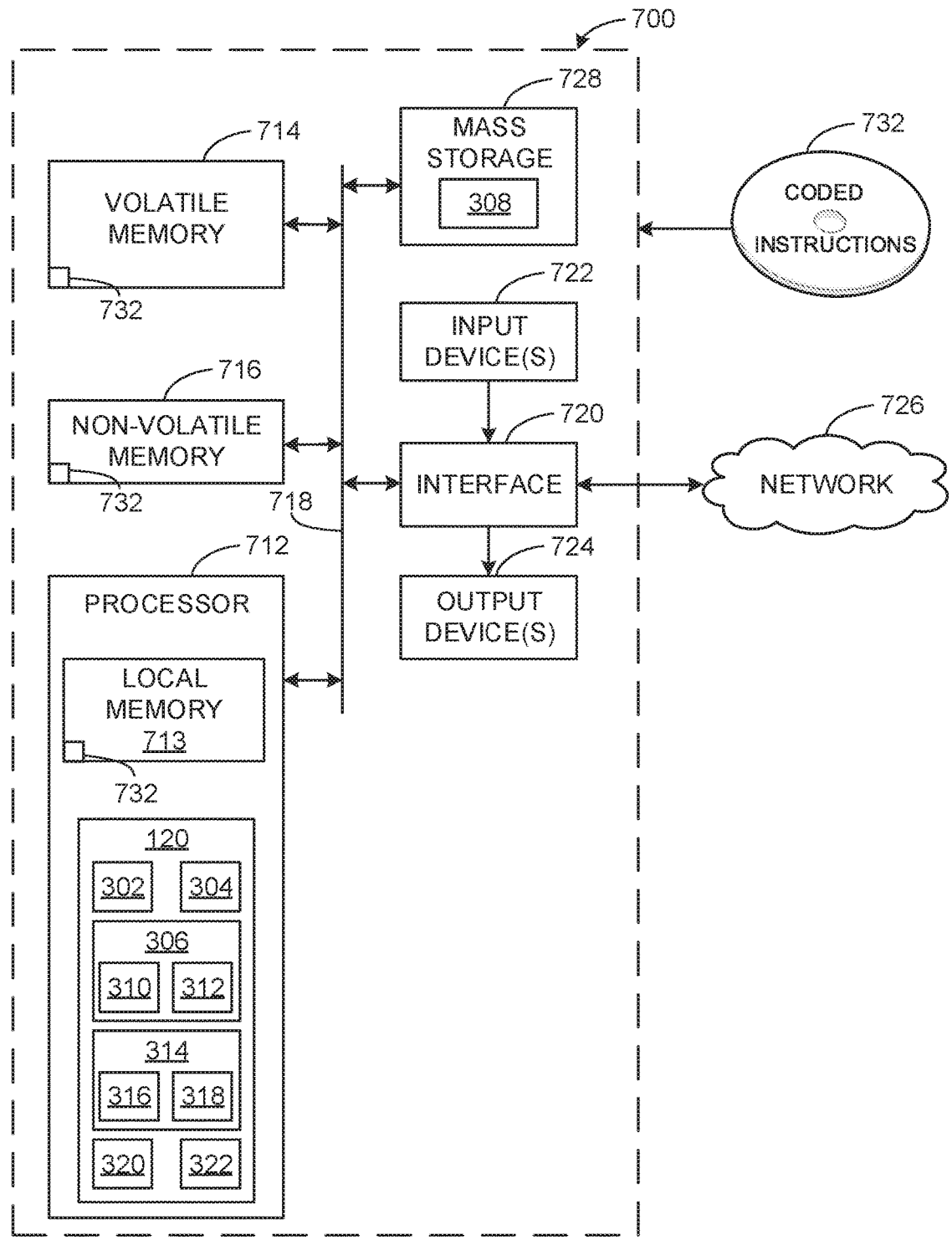
FIG. 7 is a block diagram of an example processing platform capable of executing instructions to perform the methods of FIGS. 4, 5, and/or 6 to implement the example system of FIG. 1.

FIG. 7 is a block diagram of an example processor platform 700 capable of executing instructions to implement the methods of FIGS. 4-6 to implement the apparatus of FIG. 3. The processor platform 700 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 700 of the illustrated example includes a processor 712. The processor 712 of the illustrated example is hardware. For example, the processor 712 can be implemented by one or more integrated circuits, logic circuits, microprocessors or controllers from any desired family or manufacturer. The hardware processor may be a semiconductor based (e.g., silicon based) device. In this example, the processor implements the example torque determiner 302, the example angle determiner 304, the example comparator 306 which can, in some examples, include the example torque comparator 310 and the example angle comparator 312, the example limiter 314 which can, in some examples, include the example angle limiter 316 and the example torque limiter 318, the example EPAS interface unit 320, and the example powertrain interface unit 322

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), and/or a PCI express interface.

In the illustrated example, one or more input devices 722 are connected to the interface circuit 720. The input device(s) 722 permit(s) a user to enter data and/or commands into the processor 712. The input device(s) can be implemented by, for example, an audio sensor, a microphone, a camera (still or video), a keyboard, a button, a mouse, a touchscreen, a track-pad, a trackball, isopoint device and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 720 of the illustrated example, thus, typically includes a graphics driver card, a graphics driver chip and/or a graphics driver processor.

The interface circuit 720 of the illustrated example also includes a communication device such as a transmitter, a receiver, a transceiver, a modem and/or network interface card to facilitate exchange of data with external machines (e.g., computing devices of any kind) via a network 726 (e.g., an Ethernet connection, a digital subscriber line (DSL), a telephone line, coaxial cable, a cellular telephone system, etc.).

The processor platform 700 of the illustrated example also includes one or more mass storage devices 728 for storing software and/or data. Examples of such mass storage devices 728 include floppy disk drives, hard drive disks, compact disk drives, Blu-ray disk drives, RAID systems, and digital versatile disk (DVD) drives.

Coded instructions 732 to implement the methods of FIGS. 4-6 may be stored in the mass storage device 728, in the volatile memory 714, in the non-volatile memory 716, and/or on a removable tangible computer readable storage medium such as a CD or DVD.

From the foregoing, it will be appreciated that example methods, apparatus and articles of manufacture have been disclosed that ensure the integrity of a rotatable shaft joint such as a CV joint disposed in a vehicle during both periods of high operating angle of the joint in addition to periods of large torques applied to the joint by limiting at least one of operating angle and the torque applied to the joint. Further, in cases where the torque applied is limited, torque can be redistributed to ensure that a commanded torque is preserved.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
   a comparator to determine, based on an angle of a rotatable shaft joint and a torque applied to the joint by a powertrain of a vehicle, whether at least one of (1) the torque exceeds a torque threshold or (2) the angle exceeds an angle threshold; and
   a limiter to:
     limit the torque when the angle exceeds the angle threshold; and
     limit the angle when (1) the torque exceeds the torque threshold and (2) the angle does not exceed the angle threshold.

2. The apparatus of claim 1, wherein at least one of the angle threshold or the torque threshold are based on a characteristic of the joint.

3. The apparatus of claim 1, wherein the angle of the joint is based on at least one of a steering angle or a suspension position.

4. The apparatus of claim 3, wherein the steering angle is limited by an electronic power assisted steering system.

5. The apparatus of claim 1, wherein the torque applied to the joint is based on a torque commanded by a user.

6. The apparatus of claim 5, wherein the limiter is further to distribute additional torque to non-steered wheels when the torque commanded by the user is greater than the torque threshold.

7. The apparatus of claim 1, wherein preserving the torque applied to the joint is prioritized over preserving the angle of the joint.

8. An apparatus comprising:
   a constant velocity (CV) joint load controller, the controller to evaluate a torque applied to and an angle of a CV joint, the torque applied by a powertrain of a vehicle, and wherein the controller is to limit:
     the torque applied to the CV joint when the angle of the CV joint exceeds a threshold operating angle; and
     the angle of the CV joint when (1) the torque exceeds a threshold torque and (2) the angle does not exceed a threshold operating angle.

9. The apparatus of claim 8, wherein at least one of the threshold operating angle or the threshold torque are based on a characteristic of the CV joint.

10. The apparatus of claim 8, wherein the constant velocity joint load controller further includes:
    an angle comparator to compare the angle of the CV joint to the threshold operating angle; and
    a torque comparator to compare the torque applied to the CV joint to the threshold torque.

11. The apparatus of claim 8, wherein the angle of the CV joint is based on at least one of a steering angle or a suspension position.

12. The apparatus of claim 8, wherein the torque applied to the CV joint is based on a torque commanded by a user.

13. The apparatus of claim 12, wherein the constant velocity joint load controller is further to distribute additional torque to non-steered wheels when the torque commanded by the user is greater than the threshold torque.

14. A method comprising:
    measuring an angle of a rotatable shaft joint and a torque applied to the joint by a powertrain of a vehicle;
    determining whether at least one of the torque applied to the joint exceeds a torque threshold or the angle of the joint exceeds an angle threshold; and
    limiting the torque applied to the joint in response to the angle of the joint exceeding the angle threshold; and
    limiting the angle in response to (1) the torque exceeding the torque threshold and (2) the angle not exceeding the angle threshold.

15. The method of claim 14, wherein at least one of the angle threshold or the torque threshold are based on a characteristic of the joint.

16. The method of claim 14, wherein the angle of the joint is based on at least one of a steering angle or a suspension position.

17. The method of claim 14, wherein the torque applied to the joint is based on a torque commanded by a user.

18. The method of claim 17, further including, in response to the torque commanded by the user being greater than the torque threshold, redistributing a difference of the commanded torque and the torque threshold to at least one of a non-steered wheel or a lesser steered wheel.

19. The method of claim 14, wherein preserving the angle of the joint is prioritized over preserving the torque applied to the joint.

* * * * *